United States Patent [19]

Koyama et al.

[11] Patent Number: 5,130,279
[45] Date of Patent: Jul. 14, 1992

[54] SILICON NITRIDE BASED SINTERED MATERIAL AND PROCESS OF MANUFACTURING SAME

[75] Inventors: Takashi Koyama; Hideo Ohshima; Yasutaka Aikawa, all of Omiya, Japan

[73] Assignee: Mitsubishi Materials Corporation, Tokyo, Japan

[21] Appl. No.: 649,482

[22] Filed: Feb. 1, 1991

[30] Foreign Application Priority Data

| Feb. 7, 1990 | [JP] | Japan | 2-27717 |
| Mar. 26, 1990 | [JP] | Japan | 2-76349 |
| Mar. 26, 1990 | [JP] | Japan | 2-76350 |

[51] Int. Cl.$^5$ .............. C04B 35/58; C04B 35/48; C04B 35/49
[52] U.S. Cl. .................. 501/97; 501/94; 501/96; 501/98; 501/102; 501/103; 501/108
[58] Field of Search ............. 501/92, 96, 97, 98; 423/411, 344; 428/215, 698, 446, 668

[56] References Cited

U.S. PATENT DOCUMENTS

| 4,406,667 | 9/1983 | Sarin et al. | 51/295 |
| 4,441,894 | 4/1984 | Sarin et al. | 51/295 |
| 4,560,669 | 12/1985 | Matsuhiro et al. | 501/97 |
| 4,652,276 | 3/1987 | Burden | 51/308 |
| 4,745,022 | 5/1988 | Miyake et al. | 428/216 |
| 4,801,565 | 1/1989 | Matsui | 501/98 |
| 4,877,759 | 10/1989 | Holt et al. | 501/96 |
| 4,879,263 | 11/1989 | Komeya et al. | 501/97 |

FOREIGN PATENT DOCUMENTS

| 9859 | 4/1980 | European Pat. Off. . |
| 205376 | 12/1982 | Japan . |

OTHER PUBLICATIONS

Derwent abstract (AN78-254 625) of Japanese Patent JP. A-62-176 957.

*Primary Examiner*—William R. Dixon, Jr.
*Assistant Examiner*—Michael Marcheschi
*Attorney, Agent, or Firm*—Scully, Scott, Murphy & Presser

[57] ABSTRACT

There is disclosed a silicon nitride based sintered material which contains 0.1% to 20% by volume of zirconium oxide, 0.1% to 14% by volume of zirconium nitride, 3% to 15% by volume of a binder phase of an Mg-Si-O-N or Mg-Si-Zr-O-N system, and balance β-silicon nitride. The sintered material may include an oxide layer of an average thickness of 10 to 1,000 μm in a surface thereof and having a zirconium oxide concentration increasing toward the surface thereof. A process specifically adapted to manufacture the above sintered material is also disclosed.

6 Claims, No Drawings

SILICON NITRIDE BASED SINTERED MATERIAL AND PROCESS OF MANUFACTURING SAME

BACKGROUND OF THE INVENTION

1. Field of the Invention

The present invention pertains to a silicon nitride ($Si_3N_4$) based sintered material which has high toughness and strength, and is excellent in antifracture characteristics, so that it can be suitably used to manufacture cutting tools to be employed under severe cutting conditions, and further relates to a process specifically adapted to manufacture this $Si_3N_4$ based sintered material.

2. Prior Art

As disclosed in Japanese Patent Application B-Publication No. 60-20346, there is known an $Si_3N_4$ based sintered material which is manufactured by preparing powders of $Si_3N_4$, zirconium oxide ($ZrO_2$), and magnesium oxide (MgO) as starting materials; blending these powders into a prescribed composition; compacting the mixture into a green compact; and sintering the green compact at a temperature of 1,600° C. to 2,100° C. under a pressure of 1.5 atm to 130 atm in a nitrogen atmosphere or an atmosphere of a mixture of nitrogen and inert gases.

This prior art $Si_3N_4$ based sintered material exhibits great strength, but its toughness is not sufficient. Therefore, when the material is, for example, employed to manufacture cutting tools for high-speed continuous wet cutting or rough milling of cast iron, the cutting edge is susceptible to fracturing or chipping, resulting in unduly short tool life.

SUMMARY OF THE INVENTION

It is therefore an object of the present invention to provide a silicon nitride based sintered material which exhibits not only great strength but also excellent toughness, and hence is suitably used to manufacture cutting tools to be employed under severe cutting conditions.

Another object of the invention is to provide a process suitably adapted to manufacture the aforesaid sintered material.

According to a first aspect of the present invention, there is provided a silicon nitride based sintered material essentially consisting of 0.1 to 20% by volume of $ZrO_2$, 0.1 to 14% by volume of zirconium nitride (ZrN), 3 to 15% by volume of a binder phase of a system selected from the group consisting of Mg-Si-O-N system and Mg-Si-Zr-O-N system, and balance $\beta$-$Si_3N_4$.

According to a second aspect of the invention, there is provided a process of manufacturing an $Si_3N_4$ based sintered material comprising the steps of:

(a) preparing a powder mixture essentially consisting of 1 to 27% by weight of ZrN, 0.1 to 5% by weight of silicon oxide ($SiO_2$), 1 to 10% by weight of MgO and balance $Si_3N_4$;

(b) compacting the powder mixture into a green compact;

(c) subjecting the green compact to a primary sintering at a temperature of 1,500° C. to 2,000° C. under a pressure of 1 to 50 atm in a nitrogen atmosphere; and (d) subjecting the compact thus sintered to a secondary sintering at least once at a temperature of 1,700° C. to 2,000° C. under a pressure of 100 to 2,000 atm in a nitrogen atmosphere.

In the foregoing, the sintered material may further include an oxide layer of an average thickness of 10 to 1,000 μm formed in a surface thereof and having a $ZrO_2$ concentration increasing toward the surface thereof. For producing this modified sintered material, the green compact obtained from the above compacting step (b) may be kept in an oxidizing atmosphere containing 5 to 1,000 ppm of oxygen for 30 minutes to 3 hours during a temperature elevation step from 500° C. to 1,300° C. as part of the primary sintering. Alternatively, the oxide layer could be formed by keeping the material subjected to the secondary sintering at a temperature of 500° C. to 1,000° C. in air for 30 minutes to 3 hours.

DETAILED DESCRIPTION OF THE INVENTION

After an extensive study on the improvement of the characteristics of silicon nitride based sintered material, the inventors have come to know that if a green compact of a specific composition is subjected to a primary sintering under a relatively low pressure in a nitrogen atmosphere, an excellent degree of sintering can be ensured, and that if a secondary sintering is subsequently effected at least one time under a relatively high pressure in the same nitrogen atmosphere, the resulting sintered material exhibits excellent characteristics which meet the aforesaid requirements.

More specifically, the inventors prepared powders of ZrN, $SiO_2$, MgO and $Si_3N_4$ (including $\alpha$-$Si_3N_4$ as a principal constituent) as starting materials, and blended these powders to prepare a mixture essentially consisting of 1 to 27% by weight of ZrN, 0.5 to 5% by weight of $SiO_2$, 1 to 10% by weight of MgO and balance $Si_3N_4$. Then, they compacted the mixture into a green compact under usual conditions, and subjected the green compact to a primary sintering at a temperature of 1,500° C. to 2,000° C. under a relatively low pressure of 1 to 50 atm in a nitrogen atmosphere. With this treatment, $\alpha$-$Si_3N_4$ changed into $\beta$-$Si_3N_4$ in which grains were somewhat of a needle-like shape. In addition, a liquid phase of Mg-Si-O-N or Mg-Si-Zr-O-N system which was less viscous and had an excellent wettability was obtained as a binder phase or grain-boundary phase, and hence excellent degree of sintering was achieved.

Subsequently, the material thus sintered was further subjected to a secondary sintering one time or more at a temperature of 1,700° C. to 2,000° C. under a relatively high pressure of 100 to 2000 atm in the same nitrogen atmosphere. With this sintering, a part of ZrN which served as a constituent of a dispersed phase changed into $ZrO_2$ according to the following reactions:

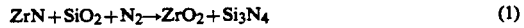
$$ZrN + SiO_2 + N_2 \rightarrow ZrO_2 + Si_3N_4 \qquad (1)$$

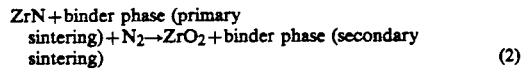
$$ZrN + \text{binder phase (primary sintering)} + N_2 \rightarrow ZrO_2 + \text{binder phase (secondary sintering)} \qquad (2)$$

During the formation of $ZrO_2$, internal micropores were eliminated to provide a more finely grown grain structure, and grains of $\beta$-$Si_3N_4$ became needle-like more fully. Furthermore, as compared with the binder phase formed by the primary sintering, the oxygen content in the binder phase decreased while nitrogen content therein increased. The resulting $Si_3N_4$ sintered material contained 0.1 to 20% by volume of $ZrO_2$, 0.1 to 14% by volume of ZrN, 3 to 15% by volume of Mg-Si-Zr-O-N system or Mg-Si-Zr-O-N system, and balance $\beta$-Si$_3$N$_4$ of needle-like grains, and exhibited excellent thermal shock resistance and wear resistance.

Thus, Si$_3$N$_4$ sintered material provided in accordance with the present invention essentially consists of 0.1 to 20% by volume of ZrO$_2$, 0.1 to 14% by volume of ZrN, 3 to 15% by volume of binder phase of Mg-Si-Zr-O-N system, and balance $\beta$-Si$_3$N$_4$ of needle-like grains.

The Si$_3$N$_4$ sintered material in accordance with the invention contains ZrN which exhibits high heat conductivity and hardness, and hence is excellent in thermal shock resistance and wear resistance. In addition, ZrO$_2$, which is chemically stable and enhances the resistance to oxidation, is contained therein and undergoes martensite transformation to absorb fracture energy when cracking has developed. This ZrO$_2$ and Si$_3$N$_4$ of needle-like grains ensure high toughness and cause the structure to become more minuscule to thereby enhance the strength of the material. In this sintered material, ZrO$_2$ forms a solid solution with Mg (with Si and N in some cases), and has a cubic or tetragonal structure. Furthermore, the binder phase, which has relatively high nitrogen content but less oxygen content, contributes to the enhancement of heat resistance. It has been realized that this binder phase is composed of one of glass phase, forsterite phase and enstatite phase, or a mixture of at least two of these phases.

The reasons why the compositions in the Si$_3$N$_4$ based sintered material are determined as recited above will hereinafter be described.

(a) ZrO$_2$

Zr, which has existed in a solid solution of the binder phase formed in the secondary sintering, mostly forms a solid solution with Mg and occasionally with Si and N during the cooling step and is deposited as ZrO$_2$. When cracking has developed, ZrO$_2$ thus formed is subjected to martensite transformation, whereby fracture energy can be absorbed thereinto, and the material is prevented from being broken. However, if its content is less than 0.1% by volume, the aforesaid advantages cannot be expected. On the other hand, if the content exceeds 20% by volume, the hardness unduly decreases, resulting in insufficient wear resistance. Therefore, the ZrO$_2$ content has been determined so as to range from 0.1% by volume to 20% by volume.

(b) ZrN

ZrN is of two kinds: one is obtained from material powder itself, while the other existed in a solid solution formed by the secondary sintering and is deposited during the cooling step. Inasmuch as ZrN has high heat conductivity and hardness, the resulting material exhibits high thermal shock resistance and wear resistance. However, if its content is less than 0.1% by volume, these advantages cannot be achieved. On the other hand, if the content exceeds 14% by volume, toughness and strength are unduly reduced. Therefore, the content is set to the range of between 0.1% and 14% by volume.

(c) Binder Phase

SiO$_2$ powder, MgO powder, SiO$_2$ existing on the surface of Si$_3$N$_4$ powder, and ZrN powder partly react with one another to produce a binder phase, in which oxygen content is relatively high while nitrogen content is low. Due to such oxygen-nitrogen concentration distribution, the binder phase exists as a liquid phase of low viscosity during the sintering operation, so that it facilitates sintering to thereby enhance the strength of the material. However, if the content of the binder phase is less than 3% by volume, a desired strength cannot be ensured. On the other hand, if the content exceeds 15% by volume, hardness and heat resistance are reduced unduly. Therefore, the content is set to the range of between 0.3% and 15% by volume.

(d) $\beta$-Si$_3$N$_4$ $\beta$-Si$_3$N$_4$ is deposited while a liquid phase is formed by SiO$_2$ existing in the surface of Si$_3$N$_4$ powder, which contains $\alpha$-Si$_3$N$_4$ as a principal constituent, SiO$_2$ powder, MgO powder and ZrN powder used as auxiliary constituents. The growth of the Si$_3$N$_4$ grains into needle-like grains is minimal during the primary sintering, but is great during the secondary sintering according to the aforesaid reaction (1). When the needle-like grains grow, the toughness is increased due to crack deflection. Furthermore, as the grains grow, micropores existing in the sintered material are absorbed, so that the sintered material develops a fine grain structure. Thanks to these structural changes, the strength of the sintered material can be markedly enhanced.

As described above, Si$_3$N$_4$ based sintered material of the invention exhibits excellent toughness, strength and antifracture characteristics, and is also superior in thermal shock resistance and wear resistance. Accordingly, when employed as cutting tools for use under the conditions where the above characteristics are required, the sintered materials of the invention exhibit excellent performance for an extremely prolonged period of time. Therefore, although the demands for high-speed operation are increasing in the field of cutting tools, the cutting tools made of the sintered material of the invention can successfully meet these demands.

Next, the process specifically suitable to manufacture the above sintered material will be described.

As will be understood from the foregoing, powders of ZrN, SiO$_2$, MgO and Si$_3$N$_4$ (including $\alpha$-Si$_3$N$_4$ as a principal constituent) are first prepared as starting materials, and are blended to prepare a mixture essentially consisting of 1 to 27% by weight of ZrN, 0.5 to 5% by weight of SiO$_2$, 1 to 10% by weight of MgO and balance Si$_3$N$_4$. Thereafter, the mixture is compacted into a green compact, which is then subjected to a primary sintering at a temperature of 1,500° C. to 2,000° C. under a pressure of 1 to 50 atm in a nitrogen atmosphere.

Subsequently, the material thus sintered is further subjected to a secondary sintering one time or more at a temperature of 1,700° C. to 2,000° C. under a pressure of 100 to 2000 atm in the same nitrogen atmosphere. The secondary sintering may be carried out in succession with the primary sintering, or separately from the primary sintering. In addition, in the case where two or more secondary sintering operations are carried out, the second sintering operation may be carried out intermittently apart from the first sintering operation. With these secondary sintering operations, a part of ZrN changes into ZrO$_2$, during which internal micropores are eliminated to cause the structure to become minute, and grains of $\beta$-Si$_3$N$_4$ became needle-like more fully. Furthermore, as compared with the binder phase formed by the primary sintering, the oxygen content in the binder phase decreases while nitrogen content therein increases. With these procedures, the heat resistance can be improved.

The reason why the manufacturing conditions are determined as set forth above will now be described.

A. Blend Composition (a) ZrN powder

During the primary sintering, ZrN exists as it is, and ensures an excellent degree of sintering. During the secondary sintering, a part of ZrN changes into $ZrO_2$, and the remaining ZrN imparts excellent thermal shock resistance and wear resistance to the sintered material, while $ZrO_2$ formed absorbs the fracture energy to enhance the toughness of the material. Accordingly, if its blend content is less than 1% by weight, the $ZrO_2$ content in the sintered material becomes less than 0.1% by volume, and the remaining ZrN content becomes less than 0.1% by volume. Hence, the aforesaid advantages cannot be expected. On the other hand, if the blend content exceeds 27% by weight, the $ZrO_2$ content becomes excessive, so that the hardness becomes insufficient to ensure a desired wear resistance. In addition, the ZrN content exceeds 14% by volume, so that the resistance to oxidation is reduced. Therefore, the ZrN content has been determined so as to range from 1% by weight to 27% by weight.

(b) $SiO_2$ and MgO powders $SiO_2$ powder and MgO powder react with $SiO_2$ existing on the surface of $Si_3N_4$, and in some cases with ZrN powder during the primary sintering to produce an Mg-Si-O-N or Mg-Si-Zr-O-N liquid phase of low viscosity, in which oxygen content is relatively high while nitrogen content is low. An excellent sintering is ensured due to this liquid phase to produce a binder phase. In addition, during the secondary sintering, the oxygen content relatively decreases while the nitrogen content increases to thereby enhance heat resistance of the sintered material. However, if $SiO_2$ content and MgO content are less than 0.1% by weight or 1% by weight, respectively, a desired degree of sintering cannot be ensured. On the other hand, if $SiO_2$ content and MgO content exceed 5% by weight or 10% by weight, respectively, the content of the binder phase exceeds 15% by volume, so that the heat resistance of the sintered material is reduced unduly. Accordingly, the blend composition is determined so as to have 0.1 to 5% by weight of $SiO_2$ and 1 to 10% by weight of MgO.

(c) $Si_3N_4$ powder

As $SiO_2$ existing in the surface of $Si_3N_4$ powder, which contains $\alpha$-$Si_3N_4$ as a principal constituent, $SiO_2$ powder and MgO powder used as auxiliary constituents, and ZrN powder form a liquid phase, $Si_3N_4$ changes into $\beta$-$Si_3N_4$ grains. The growth of $\beta$-$Si_3N_4$ is minimal during the primary sintering, but is remarkable during the second sintering, so that the needle-like grains grow according to the aforesaid reaction (1) during the secondary sintering. Therefore, micropores existing in the sintered material are absorbed, and the grain structure of the sintered material become fine, so that the strength of the material is markedly enhanced. Thus, $Si_3N_4$ powder is essential and is blended as a principal constituent so as to balance the aforesaid other constituents. In addition, in order to ensure an excellent and uniform degree of sintering, it is preferable to use powders of minuscule particles having a narrow particle size distribution.

B. Conditions for Primary Sintering

During the primary sintering, there must be produced a binder phase of low viscosity, in which oxygen content is relatively high while nitrogen content is low so that an excellent sintering can be ensured. However, if the sintering temperature is less than 1,500° C. or if the sintering pressure is less than 1 atm, the binder phase cannot be formed sufficiently, and hence a satisfactory degree of sintering cannot be ensured. On the other hand, if the pressure exceeds 50 atm, nitrogen gas of such high pressure is confined within the sintered body, and adversely affects the degree of sintering. In addition, it impedes the absorption of micropores to prevent the sintered body from becoming minute and further to prevent needle-like $\beta$-$Si_3N_4$ grains from growing. Furthermore, in order to achieve a temperature exceeding 2,000° C. a manufacturing installation must be made unduly large in scale. Accordingly, the temperature and pressure at the primary sintering have been set to the range of 1,500° to 2,000° C. and the range of 1 to 50 atm, respectively.

C. Condition for Secondary Sintering

During the secondary sintering, inasmuch as the aforesaid reactions (1) and (2) occur, the heat resistance of the binder phase is enhanced due to the decrease in oxygen content and increase in nitrogen content, and $ZrO_2$ is formed from a part of ZrN. In addition, the growth of needle-like $\beta$-$Si_3N_4$ grains is remarkably promoted, and the micropores existing in the sintered body are absorbed to cause the sintered body to become minute, whereby high toughness and high strength can be ensured. However, if the sintering temperature is less than 1,700° C. , or if the sintering pressure is less than 100 atm, the aforesaid reactions (1) and (2) do not occur sufficiently, so that excellent characteristics as described above cannot be imparted to the sintered material. On the other hand, if the temperature exceeds 2,000° C., or if the pressure exceeds 2,000 atm, the installation must be made unduly large in scale. Accordingly, the temperature and pressure at the secondary sintering have been set to the range of 1700° to 2000° C. and the range of 100 to 2000 atm, respectively.

In the foregoing, although the primary and secondary sintering conditions depend on the blend composition as described above, the pressure at the secondary sintering should be naturally set greater than that at the primary sintering.

Furthermore, the $Si_3N_4$ sintered material manufactured as described above may be modified so as to include an oxide layer of an average thickness of 10 to 1,000 $\mu$m in a surface thereof and having a $ZrO_2$ concentration increasing toward the surface thereof. When a destructive stress is exerted on the surface of the material, this oxide layer serves to subject $ZrO_2$ to martensite transformation to thereby absorb the stress. Therefore, the resulting material is less susceptible to fracturing or chipping. However, if the average layer thickness of the oxide layer is less than 10 $\mu$m, the additional advantage as described above cannot be obtained. On the other hand, it is found that if the layer thickness exceeds 1,000 $\mu$m, the wear resistance abruptly decreases. Therefore, the average layer thickness of the oxide layer has been determined to the range of between 10 $\mu$m and 1,000 $\mu$m.

Furthermore, for forming the aforesaid oxide layer on the surface of the material, the above manufacturing method may be modified as follows:

The atmosphere in which temperature is elevated from 500° C. to 1,300° C. in the primary sintering is modified to an oxidizing one containing 5 to 1,000 ppm of oxygen, and the green compact is kept in the atmosphere for a period of time of 30 minutes to 3 hours.

Alternatively, without modifying the primary sintering operation, the material subjected to the secondary sintering may be kept at a temperature of 500° C. to 1,000° C. in atmospheric for 30 minutes to 3 hours. Furthermore, these oxidation treatments may be both carried out as appropriate.

The present invention will now be described in more detail by way of the following examples.

EXAMPLE 1

There were prepared starting powders of $Si_3N_4$ ($\alpha/\beta = 97/3$ by volume ratio; oxygen content: 2% by weight), ZrN (oxygen content: 3% by weight), $SiO_2$, MgO and $ZrO_2$ each having an average particle size of 0.1 to 0.5 μm. These powders were blended in compositions as set forth in Tables 1-1 and 1-2, and were subjected to wet mixing in a ball mill for a period of 72 hours. After being dried, the mixtures were compacted to form green compacts each having a size of 30 mm × 30 mm × 10 mm and green compacts each having a shape of a cutting insert in conformity with JIS (Japanese Industrial Standard) SNGN120408. These green compacts were then subjected to primary and secondary sintering under the conditions as set forth in Tables 1-1 and 1-2 to produce sintered materials 1 to 14 of the invention, comparative sintered materials 1 to 8 and prior art sintered material 1.

As to the various sintered materials thus obtained, their compositions were measured. In this example, the contents of $ZrO_2$ and ZrN were obtained by calculation using intensity measurement of X-ray diffraction peaks for $Si_3N_4$, $ZrO_2$ and ZrN, while the content of the binder phase of Mg-Si-O-N system or Mg-Si-Zr-O-N system was obtained by an EPMA (X-ray microanalyser) observation of a specular polished surface of the specimen. Moreover, theoretical density ratio, Rockwell hardness (A scale), transverse rupture strength were measured, and fracture toughness was also measured by indentation method.

Furthermore, using a vertical milling machine, the sintered materials were subjected to interrupted cutting test of cast iron under the following conditions:

Workpiece: cast iron (JIS.FC25) square bar with bores having a width of 150 mm and a length of 300 mm
Cutting speed: 200 m/minute
Depth of cut: 2 mm
Feed rate: 0.25 mm/revolution
Chamfer honing of cutting edge: 0.15 mm × −25°

In this test, it was measured how long it took until the cutting edge was subjected to chipping. The results are set forth in Table 2.

As will be clearly seen from Table 2, the sintered materials 1 to 14 of the invention had theoretical density ratios of no less than 99% and had less micropores formed, so that they were very fine. Therefore, the sintered materials 1 to 14 of the invention exhibited excellent toughness, strength and antifracture characteristics as compared with the comparative sintered materials 1 to 8 and the prior art material 1, and exhibited great hardness equivalent to the prior art materials.

EXAMPLE 2

Starting powders similar to those in Example 1 were prepared and blended in compositions as set forth in Table 3, and the same procedures as in Example 1 were repeated to produce green compacts. These compacts were then subjected to primary and secondary sintering under the conditions as set forth in Table 3 to produce sintered materials 15 to 28 of the invention and prior art sintered materials 2 to 4.

As to the various sintered materials thus obtained, the their compositions, theoretical density ratios, Rockwell hardness (A scale), transverse rupture strength and fracture toughness were measured in a manner similar to Example 1. In addition, as to the surface oxide layer of each material, its layer thickness was measured and its $ZrO_2$ concentration distribution was observed by X-ray diffraction. Furthermore, the sintered materials were subjected to interrupted cutting test under the same conditions as in Example 1. The results are set forth in Table 4.

As clearly seen from Table 4, the sintered materials 15 to 28 of the invention had theoretical density ratios of no less than 99% and had less micropores formed, so that they were very fine. Therefore, the sintered materials 15 to 28 of the invention exhibited excellent toughness, strength and antifracture characteristics as compared with the prior art sintered materials 2 to 4, and exhibit high hardness equivalent to the prior art materials.

As described above, $Si_3N_4$ based sintered material of the invention exhibits excellent toughness, strength and antifracture characteristics as compared with the prior art sintered materials, and exhibit high hardness equivalent to the prior art materials. Accordingly, when employed as cutting tools for use under the conditions where the above characteristics are required, the sintered materials of the invention exhibit excellent performance for an extremely prolonged period of time. Therefore, although the demands for high-speed operation are increasing in the field of cutting tools, the cutting tools of the sintered material of the invention can meet these demands successfully.

Obviously, numerous modifications and variations of the present invention are possible in light of the above teachings. It is therefore to be understood that within the scope of the appended claims, the invention may be practiced otherwise than as specifically described herein.

TABLE 1-1

| | Blending Composition (% by weight) | | | | | Manufacturing conditions | | | | | | | |
|---|---|---|---|---|---|---|---|---|---|---|---|---|---|
| | | | | | | Primary sintering | | | | Secondary sintering | | | |
| | ZrN | SiO₂ | MgO | ZrO₂ | Si₃N₄ | Temperature (°C.) | N₂ Pressure (atm) | Time (hr) | Transfer to second sintering | Temperature (°C.) | N₂ Pressure (atm) | Time (hr) | Number of secondary sinterings |
| | | | | | | Sintered materials of the invention | | | | | | | |
| 1 | 20 | 2 | 5 | — | other | 1600 | 10 | 1 | Direct | 1700 | 1000 | 2 | 1 |
| 2 | 15 | 2 | 5 | — | other | 1500 | 10 | 2 | Direct | 1750 | 100 | 2 | 1 |
| 3 | 10 | 2 | 5 | — | other | 1550 | 20 | 2 | Direct | 1800 | 500 | 1 | 1 |
| 4 | 5 | 2 | 5 | — | other | 1500 | 10 | 1 | Direct | 1700 | 1000 | 3 | 1 |
| 5 | 1 | 2 | 5 | — | other | 1600 | 20 | 3 | Delayed | 1750 | 1500 | 2 | 2 |
| 6 | 5 | 5 | 5 | — | other | 1600 | 30 | 2 | Direct | 1750 | 100 | 2 | 1 |

TABLE 1-1-continued

| | Blending Composition (% by weight) | | | | | Manufacturing conditions | | | | | | | |
|---|---|---|---|---|---|---|---|---|---|---|---|---|---|
| | | | | | | Primary sintering | | | | Secondary sintering | | | |
| | ZrN | SiO$_2$ | MgO | ZrO$_2$ | Si$_3$N$_4$ | Temperature (°C.) | N$_2$ Pressure (atm) | Time (hr) | Transfer to second sintering | Temperature (°C.) | N$_2$ Pressure (atm) | Time (hr) | Number of secondary sinterings |
| 7 | 5 | 1 | 5 | — | other | 1700 | 20 | 1 | Delayed | 1700 | 2000 | 3 | 2 |
| 8 | 5 | 0.5 | 5 | — | other | 1700 | 20 | 2 | Delayed | 1700 | 1000 | 4 | 2 |
| 9 | 5 | 2 | 10 | — | other | 1500 | 50 | 1 | Delayed | 1700 | 1800 | 1 | 1 |
| 10 | 5 | 2 | 7 | — | other | 1600 | 20 | 2 | Direct | 1800 | 1000 | 2 | 1 |
| 11 | 5 | 2 | 2 | — | other | 1800 | 20 | 2 | Direct | 1750 | 1000 | 2 | 1 |
| 12 | 15 | 5 | 7 | — | other | 1550 | 50 | 2 | Direct | 1750 | 1000 | 2 | 3 |
| 13 | 3 | 1 | 3 | — | other | 1850 | 20 | 2 | Delayed | 1750 | 500 | 2 | 1 |
| 14 | 27 | 2 | 5 | — | other | 1750 | 20 | 2 | Delayed | 1750 | 1000 | 1 | 1 |

TABLE 1-2

| | Blending Composition (% by weight) | | | | | Manufacturing conditions | | | | | | | |
|---|---|---|---|---|---|---|---|---|---|---|---|---|---|
| | | | | | | Primary sintering | | | | Secondary sintering | | | |
| | ZrN | SiO$_2$ | MgO | ZrO$_2$ | Si$_3$N$_4$ | Temperature (°C.) | N$_2$ Pressure (atm) | Time (hr) | Transfer to second sintering | Temperature (°C.) | N$_2$ Pressure (atm) | Time (hr) | Number of secondary sinterings |
| | Comparative sintered materials | | | | | | | | | | | | |
| 1 | 30 | 2 | 5 | — | other | 1600 | 10 | 1 | Delayed | 1750 | 1000 | 1 | 1 |
| 2 | 0.5 | 2 | 5 | — | other | 1600 | 10 | 1 | Delayed | 1750 | 1000 | 1 | 2 |
| 3 | 5 | 8 | 5 | — | other | 1700 | 20 | 2 | Direct | 1800 | 100 | 2 | 1 |
| 4 | 5 | — | 5 | — | other | 1750 | 30 | 1 | Direct | 1750 | 200 | 1 | 1 |
| 5 | 23 | 2 | 4 | — | other | 1750 | 30 | 1 | Direct | 1750 | 200 | 1 | 1 |
| 6 | 5 | 1 | — | — | other | 1750 | 20 | 1 | Delayed | 1750 | 1000 | 1 | 1 |
| 7 | 5 | 2 | 5 | — | other | 1500 | 10 | 1 | — | — | — | — | — |
| 8 | 5 | 2 | 5 | — | other | — | — | — | — | 1700 | 1000 | 3 | — |
| | Prior art sintered materials | | | | | | | | | | | | |
| 1 | — | — | 3 | 5 | other | 1850 | 50 | 2 | — | — | — | — | — |

TABLE 2

| | Composition (% by volume) | | | | Theoretical density ratio (%) | Rockwell hardness (H$_R$A) | Transverse rupture strength (kg/mm$^2$) | Fracture toughness (MN/m$^{3/2}$) | Time of cutting until the chipping of cutting edge (min) |
|---|---|---|---|---|---|---|---|---|---|
| | ZrN | ZrO$_2$ | Binder Phase | Si$_3$N$_4$ | | | | | |
| | Sintered materials of the invention | | | | | | | | |
| 1 | 1 | 14 | 9 | other | 99.6 | 91.5 | 110 | 7.0 | 100 |
| 2 | 6 | 2 | 7 | other | 99.8 | 91.7 | 98 | 6.8 | 120 |
| 3 | 2 | 6 | 8 | other | 100.0 | 92.0 | 105 | 6.5 | 128 |
| 4 | 1 | 3 | 7 | other | 99.9 | 92.4 | 99 | 6.9 | 112 |
| 5 | 0.5 | 0.1 | 9 | other | 99.7 | 93.0 | 113 | 7.1 | 108 |
| 6 | 2 | 1 | 7 | other | 100.0 | 92.6 | 105 | 6.8 | 140 |
| 7 | 1 | 3 | 8 | other | 99.8 | 92.7 | 98 | 7.2 | 144 |
| 8 | 0.5 | 3 | 7 | other | 99.6 | 92.6 | 100 | 7.4 | 120 |
| 9 | 1 | 3 | 13 | other | 99.6 | 92.2 | 118 | 7.1 | 116 |
| 10 | 0.1 | 3 | 10 | other | 100.0 | 91.9 | 103 | 6.8 | 112 |
| 11 | 2 | 2 | 4 | other | 99.7 | 92.6 | 115 | 6.9 | 148 |
| 12 | 2 | 9 | 10 | other | 99.9 | 91.6 | 106 | 7.2 | 104 |
| 13 | 1 | 1 | 5 | other | 99.9 | 93.0 | 116 | 7.3 | 120 |
| 14 | 4 | 15 | 4 | other | 99.8 | 91.0 | 114 | 6.9 | 108 |
| | Comparative sintered materials | | | | | | | | |
| 1 | 2 | 21 | 8 | other | 98.7 | 90.1 | 64 | 5.4 | 40 |
| 2 | 0.2 | 0 | 7 | other | 98.4 | 92.5 | 66 | 4.2 | 60 |
| 3 | 0.1 | 3 | 16 | other | 94.3 | 90.2 | 56 | 5.6 | 8 |
| 4 | 4 | 0.2 | 2 | other | 82.0 | 90.5 | 42 | 6.0 | 12 |
| 5 | 15 | 2 | 8 | other | 91.0 | 88.4 | 45 | 4.2 | 10 |
| 6 | 2 | 0 | 1 | other | 87.0 | 89.1 | 35 | 5.7 | 16 |
| 7 | 5 | 0 | 7 | other | 90.2 | 90.4 | 53 | 5.6 | 10 |
| 8 | 0 | 4 | 9 | other | 82.3 | 87.2 | 37 | 4.2 | 7 |
| | Prior art sintered materials | | | | | | | | |
| 1 | — | 4 | 7 | other | 96.2 | 91.4 | 72 | 5.6 | 50 |

TABLE 3

| | Blending Composition (% by weight) | | | | | Manufacturing conditions | | |
|---|---|---|---|---|---|---|---|---|
| | | | | | | Oxidation treatment prior to primary sintering | | |
| | ZrN | SiO2 | MgO | ZrO$_2$ | Si$_3$N$_4$ | Oxygen content in N$_2$ atmosphere (ppm) | Temperature (°C.) | Time (hr) |

TABLE 3-continued

| | | | | Sintered materials of the invention | | | | |
|---|---|---|---|---|---|---|---|---|
| 15 | 20 | 2 | 5 | — | other | 5 | 1000 | 2 |
| 16 | 15 | 2 | 5 | — | other | 5 | 1300 | 2 |
| 17 | 10 | 2 | 5 | — | other | 50 | 500 | 3 |
| 18 | 5 | 2 | 5 | — | other | 50 | 1000 | 1 |
| 19 | 1 | 2 | 5 | — | other | 1000 | 1300 | 0.5 |
| 20 | 5 | 5 | 5 | — | other | 1000 | 500 | 3 |
| 21 | 5 | 1 | 5 | — | other | 100 | 1000 | 2 |
| 22 | 5 | 0.5 | 5 | — | other | 100 | 1300 | 1 |
| 23 | 5 | 2 | 10 | — | other | 500 | 500 | 3 |
| 24 | 5 | 2 | 7 | — | other | 500 | 1000 | 0.5 |
| 25 | 5 | 2 | 2 | — | other | 500 | 1300 | 1 |
| 26 | 15 | 5 | 7 | — | other | 100 | 500 | 3 |
| 27 | 3 | 1 | 3 | — | other | 1000 | 1000 | 0.5 |
| 28 | 27 | 2 | 5 | — | other | 50 | 1300 | 1 |
| | | | | Prior art sintered materials | | | | |
| 2 | — | — | 5 | 5 | other | — | — | — |
| 3 | — | — | 8 | 6 | other | — | — | — |
| 4 | — | — | 2 | 12 | other | — | — | — |

| | Manufacturing conditions | | | | | | |
|---|---|---|---|---|---|---|---|
| | Primary sintering | | | | Secondary sintering | | |
| | Temperature (°C.) | N₂ Pressure (atm) | Time (hr) | Transfer to second sintering | Temperature (°C.) | N₂ Pressure (atm) | Time (hr) | Number of secondary sinterings |
| | Sintered materials of the invention | | | | | | | |
| 15 | 1600 | 10 | 1 | Direct | 1700 | 1000 | 2 | 1 |
| 16 | 1500 | 10 | 2 | Direct | 1750 | 100 | 2 | 1 |
| 17 | 1550 | 20 | 2 | Direct | 1800 | 500 | 1 | 1 |
| 18 | 1500 | 10 | 1 | Direct | 1700 | 1000 | 3 | 1 |
| 19 | 1600 | 20 | 3 | Delayed | 1750 | 1500 | 2 | 2 |
| 20 | 1600 | 30 | 2 | Direct | 1750 | 100 | 2 | 1 |
| 21 | 1700 | 20 | 1 | Delayed | 1700 | 2000 | 3 | 2 |
| 22 | 1700 | 20 | 2 | Delayed | 1700 | 1000 | 4 | 2 |
| 23 | 1500 | 50 | 1 | Delayed | 1700 | 1800 | 1 | 1 |
| 24 | 1600 | 20 | 2 | Direct | 1800 | 1000 | 2 | 1 |
| 25 | 1800 | 20 | 2 | Direct | 1750 | 1000 | 2 | 1 |
| 26 | 1550 | 50 | 2 | Direct | 1750 | 1000 | 2 | 3 |
| 27 | 1850 | 20 | 2 | Delayed | 1750 | 500 | 2 | 1 |
| 28 | 1750 | 20 | 2 | Delayed | 1750 | 1000 | 1 | 1 |
| | Prior art sintered materials | | | | | | | |
| 2 | 1850 | 50 | 1 | — | — | — | — | — |
| 3 | 1800 | 20 | 2 | — | — | — | — | — |
| 4 | 1850 | 50 | 1 | — | — | — | — | — |

TABLE 4

| | Composition (% by volume) | | | | Average thickness of oxide layer (μm) | Theoretical density ratio (%) | Rockwell Hardness ($H_RA$) | Transverse rupture strength (kg/mm²) | Fracture toughness (MN/m^{3/2}) | Time of cutting until the chipping of cutting edge (min) |
|---|---|---|---|---|---|---|---|---|---|---|
| | ZrN | ZrO₂ | Binder Phase | Si₃N₄ | | | | | | |
| | Sintered materials of the invention | | | | | | | | | |
| 15 | 1 | 14 | 9 | other | 900 | 99.7 | 91.6 | 111 | 7.1 | 108 |
| 16 | 6 | 2 | 7 | other | 70 | 99.7 | 91.8 | 99 | 6.9 | 110 |
| 17 | 2 | 6 | 8 | other | 300 | 99.9 | 92.1 | 107 | 6.7 | 120 |
| 18 | 1 | 3 | 7 | other | 700 | 100.0 | 92.3 | 101 | 7.1 | 106 |
| 19 | 0.5 | 0.1 | 9 | other | 400 | 99.6 | 93.1 | 115 | 7.2 | 113 |
| 20 | 2 | 1 | 7 | other | 700 | 99.8 | 92.6 | 105 | 6.9 | 128 |
| 21 | 1 | 3 | 8 | other | 30 | 100.0 | 92.7 | 98 | 7.2 | 104 |
| 22 | 0.5 | 3 | 7 | other | 20 | 99.6 | 92.7 | 101 | 7.5 | 106 |
| 23 | 1 | 3 | 13 | other | 800 | 99.6 | 92.0 | 118 | 7.1 | 123 |
| 24 | 0.1 | 3 | 10 | other | 600 | 99.8 | 92.1 | 104 | 6.9 | 106 |
| 25 | 2 | 2 | 4 | other | 150 | 99.8 | 92.7 | 115 | 6.9 | 110 |
| 26 | 2 | 9 | 10 | other | 500 | 100.0 | 91.7 | 107 | 7.3 | 120 |
| 27 | 1 | 1 | 5 | other | 700 | 100.0 | 93.1 | 116 | 7.3 | 118 |
| 28 | 4 | 15 | 4 | other | 800 | 99.9 | 91.2 | 114 | 7.0 | 104 |
| | Prior art sintered materials | | | | | | | | | |
| 2 | 2 | 2 | 6 | other | — | 98.2 | 91.4 | 87 | 5.9 | 64 |
| 3 | 0 | 5 | 12 | other | — | 96.4 | 91.5 | 82 | 5.7 | 57 |
| 4 | 0 | 10 | 4 | other | — | 97.8 | 90.7 | 78 | 5.2 | 23 |

What is claimed is:

1. A silicon nitride based sintered material consisting essentially of 0.1% to 20% by volume of zirconium oxide, 0.1% to 14% by volume of zirconium nitride, 3% to 15% by volume of a binder phase of a system selected from the group consisting of Mg-Si-O-N system and Mg-Si-Zr-O-N system, and balance β-silicon nitride.

2. A silicon nitride based sintered material consisting essentially of 0.1% to 20% by volume of zirconium oxide, 0.1% to 14% by volume of zirconium nitride, 3% to 15% by volume of a binder phase of a system selected from the group consisting of Mg-Si-O-N system and Mg-Si-Zr-O-N system, and balance $\beta$-silicon nitride, and an oxide layer comprising zirconium oxide of an average thickness of 10 to 1,000 $\mu$m on a surface of the sintered material, wherein the concentration of said zirconium oxide in said oxide layer increases toward the surface of said oxide layer.

3. A process for manufacturing a silicon nitride based sintered material comprising the steps of:
   (a) preparing a powder mixture consisting essentially of 1 to 27% by weight of zirconium nitride, 0.1 to 5% by weight of silicon oxide, 1 to 10% by weight of magnesium oxide and balance silicon nitride;
   (b) compacting said powder mixture into a green compact;
   (c) subjecting said green compact to a primary sintering at a temperature of 1,500° C. to 2,000° C. under a pressure of 1 to 50 atm in a nitrogen atmosphere; and
   (d) subjecting the compact thus sintered to a secondary sintering at least once at a temperature of 1,700° C. to 2,000° C. under a pressure of 100 to 2,000 atm in a nitrogen atmosphere.

4. A process for manufacturing a silicon nitride based sintered material according to claim 3, which further comprises subjecting said green compact obtained from said compacting step (b) to an oxidizing atmosphere containing 5 to 1,000 ppm of oxygen for 30 minutes to 3 hours during temperature elevation from 500° C. to 1,300° C. prior to said primary sintering step (c).

5. A process for manufacturing a silicon nitride based sintered material according to claim 3, which further comprises subjecting said material to temperatures of 500° C. to 1,000° C. in air for 30 minutes to 3 hours subsequent to said secondary sintering step (d).

6. A process for manufacturing a silicon nitride based sintered material according to claim 4, which further comprises subjecting said material to temperatures of 500° C. to 1,000° C. in air 30 minutes to 3 hours subsequent to said secondary sintering step (d).

* * * * *